Figure 1:
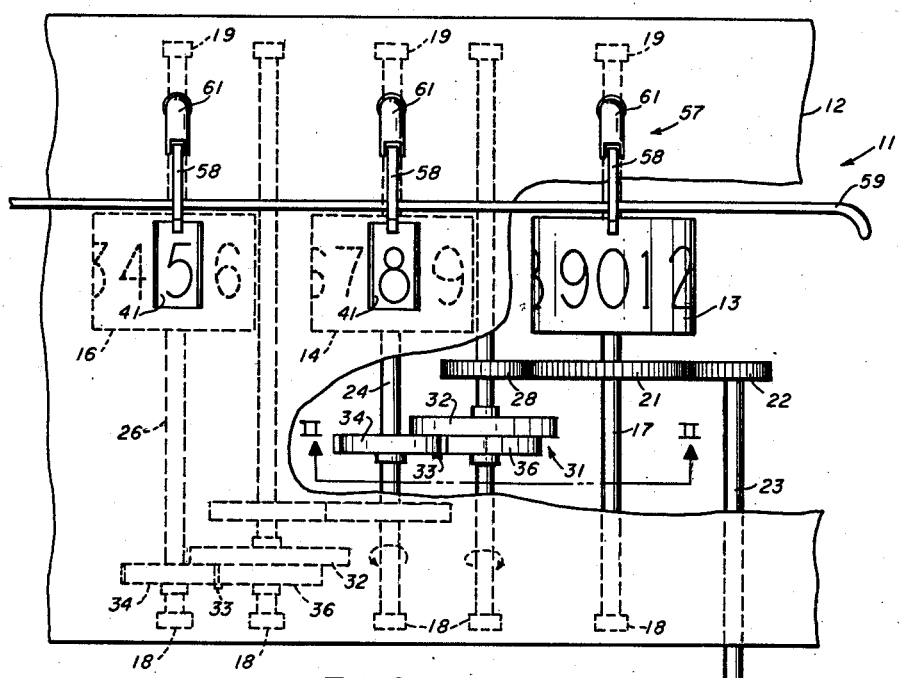

Feb. 11, 1964   R. L. HOPTON ETAL   3,120,925
HIGH SPEED DIGITAL REGISTER-COUNTER
Filed Oct. 26, 1962   2 Sheets-Sheet 1

INVENTORS
ROBERT L. HOPTON
EDWARD J. WESLEY
BY  AGENT

ATTORNEYS

Feb. 11, 1964 R. L. HOPTON ETAL 3,120,925
HIGH SPEED DIGITAL REGISTER-COUNTER
Filed Oct. 26, 1962 2 Sheets-Sheet 2
FIG. 3
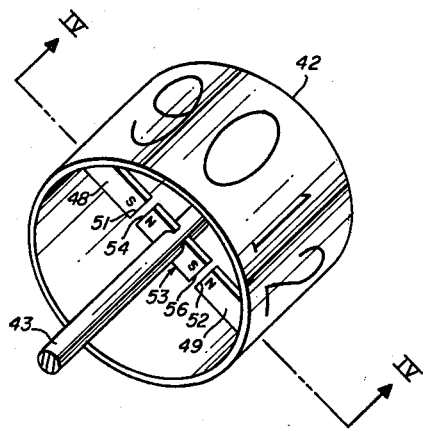
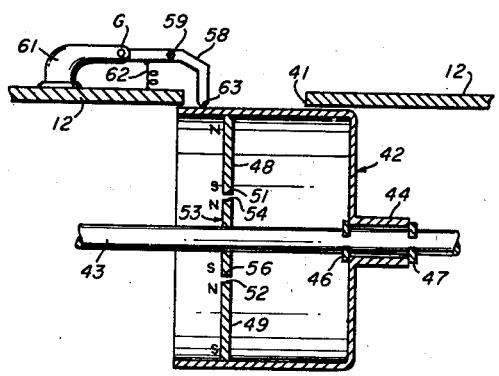
FIG. 4
INVENTORS
ROBERT L. HOPTON
EDWARD J. WESLEY
BY *Richard P. Howard Jr.* AGENT
ATTORNEYS ized Feb. 11, 1964

3,120,925
HIGH SPEED DIGITAL REGISTER-COUNTER
Robert L. Hopton, Millbrae, and Edward J. Wesley, San Mateo, Calif., assignors to the United States of America as represented by the Secretary of the Navy
Filed Oct. 26, 1962, Ser. No. 233,488
6 Claims. (Cl. 235—110)
(Granted under Title 35, U.S. Code (1952), sec. 266)

The invention described herein may be manufactured and used by or for the Government of the United States of America for governmental purposes without the payment of any royalties thereon or therefor.

The present invention relates to a high-speed digital register-counter and, more specifically, to such a register-counter employing a low-inertia magneto-mechanical drive system adapted to drive the register-counter at high speeds.

The pace of allied technology has imposed a need for mechanical register-counters which can operate satisfactorily at a substantial greater speed of operation than previously was required. Illustrative, for example, of this needed new-generation high-speed mechanical register-counters are registers to be used as readout devices for indicating intermittently-accumulated counts detected by radiation dose meters or for indicating the detection outputs of radiation dose rate meters.

Prior art register-counters are intrinsically too slow, even at their maximum speed of operation, satisfactorily to reflect a digital readout as would be occasioned by devices such as the radiation dose or doserate meters, described above, or other like devices. These prior-art mechanical register-counters generally employ a series of digit-indicating wheels, each wheel being cylindrical in shape and carrying, in sequence, on its outer face, at equally-spaced intervals, a series of digits ranging from "0" through "9." These digit-indicating wheels are disposed parallel to one another in a linearly-oriented series and each wheel has a cooperatively-disposed "window" which permits display by the wheel via its "window" of the single digit ("0" through "9") intended to be operatively indicated by the given wheel. Respective wheels in a series will portray (via their "windows") "units," "tens," "hundreds," "thousands," etc., so that the series of wheels, read as a group unit, will portray any specific number within the range permitted by the number of wheels in the register-counter linear series of such wheels.

As a general rule, all of the digit-indicating wheels in a given linear series of register-counter wheels are rotated by their drive mechanism in the same direction and, in a given series of digit-indicating wheels, the respective wheels of the series are driven in a step-advancing operation wherein a 'tens" unit wheel makes 1/10 rotation for each complete rotation of the "units" wheels, the "hundreds" unit wheel makes 1/10 rotation for each complete rotation of the "tens" wheel and "higher-order" wheels follow in the same sort of sequence. In accomplishing this step-advancing movement of the digit-indicating wheels, these prior art devices employ mechanically-coupled, intermittent-motion gear drives, such as, for example, the universally-familiar Geneva gear drive, between successive digit-indicating wheels. Such a direct, mechanically-coupled drive system has a prime disadvantage in that it has a high angular moment of inertia. Since the system is driven intermittently there are times when it is necessary to accelerate a given digit-indicating wheel from a complete stop and then bring it to a sudden stop, say in 1/10 of a rotation of the wheel. This requirement of the drive system and of the various digit-indicating wheels, to which it is mechanically coupled, to undergo sudden starts and stops results not only in aggravated wear in proportion to the mass being accelerated/decelerated, but, what may be viewed in this context to be more serious, limits the possible speed of operation of these prior-art register-counters with their relatively high mass, high angular moment of inertia drive system.

The register-counter of the present invention uses digit-indicating wheels similar to those in the prior-art devices, but embraces a new type of low-inertia magneto-mechanical drive system for suitably driving the respective wheels to indicate the operative digital display. In the drive system employed herein the various digit-indicating wheels are mounted for free rotation about their respective axes, each digit-indicating wheel, per se, preferring no rotational position to any other, irrespective of the given attitude of the wheel. The digit-indicating wheels of this device are magnetically coupled to the drive gears (for the purpose of assuming their proper respective digit-indicating rotational positions) only at the terminal portion of a count adding operation. During most of the interval of the count-adding operation the digit-indicating wheels are substantially uncoupled to the drive gears. Each of the balanced digit-indicating wheels is provided with a pair of oppositely-poled small permanent magnets which are disposed along a radial line of the cylindrical wheel and which abut from diametrically opposed portions of the inner face of the digit-indicating wheel. Each of the digit-indicating wheels is mounted for free rotation about a drive-gear-driven shaft and each of these shafts has a permanent magnet embedded therein and extending radially therefrom. The shaft-embedded magnet is adapted to magnetically couple during an operative coupling interval with the oppositely placed magnets of the digit-indicating wheel to bring the digit-indicating wheel into a single, unequivocal, rotational position which is in alignment with the current rotational position of the gear-driven shaft on which it is slidably mounted—the resulting digit-indicating wheel position causing the wheel to display the proper digit for reading by an operator. According to well-known magnetic laws the digit-indicating wheel will assume a position during operative coupling wherein its two magnets are lined up with the magnet affixed to its drive shaft. This position is unequivocal, the digit-indicating wheel turning half a turn, if necessary, to come into alignment and proper indicating position. The result is to produce a low-mass drive system having a low angular moment of inertia. A register-counter so constructed, unlike the prior-art register-counters with their relatively high-mass and high angular moment of inertia, can operate at the high speeds noted supra and permits of longer life and more reliable operation than previously has been attainable.

An object of the present invention is to provide a register-counter capable of high-speed operation.

A further object is to provide a register-counter of long life.

Still another object is to provide a register-counter of improved reliability.

And another object is to furnish a register-counter which combines all of the above-enumerated objectives.

Other objects and many of the attendant advantages of this invention will be readily appreciated as the same becomes better understood by reference to the following detailed description when considered in conjunction with the accompanying drawing wherein:

FIG. 1 shows a partial face view of the register-counter;

FIGS. 2(a) and 2(b) portray the intermittent-motion gear drive interconnecting adjoining digit-indicating-wheel shafts as seen along the line II—II of FIG. 1;

FIG. 3 portrays an individual digit-indicating wheel and its supporting shaft; and FIG. 4 is a sectional view of an individual digit-indicating wheel such as would be seen along the line IV—IV of FIG. 3 and adjacent casing structure.

FIG. 1 represents a partial view showing the significant structure of the mechanical register-counter 11 of the invention and portrays, among other elements, a casing 12 and digit-indicating wheels 13, 14, and 16 which respectively denote units, tens, and hundreds digits. The "units" digit-indicating wheel 13 is slideably mounted for free rotation on a shaft 17 which, in turn, is supported at its respective ends in conventional bearings 18 and 19, respectively. Fixedly mounted on this shaft 17 is a gear 21 which meshes with gear 22 which is rigidly mounted on and rotated by externally driven shaft 23.

Succeeding digit-indicating wheels, such as indicating wheel 14 for indicating the "tens" units and digit-indicating wheel 16 for indicating "hundreds" units, are likewise slideably mounted for respective free rotation about shafts 24 and 26, respectively, which also are suitably supported at their ends in conventional bearings 18 and 19. The successive digit-indicating wheels are interconnected by driving means such that they all rotate in the same direction and in such a manner that the "tens" wheel 14 makes $1/10$ of a rotation for each complete rotation of the "units" wheel 13 and the "hundreds" wheel 16 makes $1/10$ of a rotation for each complete rotation of the "tens" wheel 14. Higher order digit-indicating wheels in a continuing series of such wheels are similarly driven in such a step-advancing movement.

Figure 2:
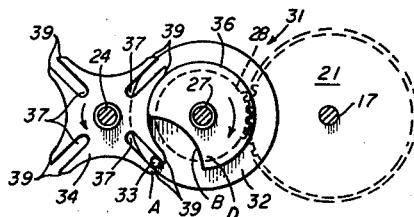
Figure 2:
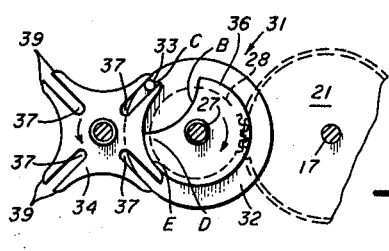

The driving means interconnecting respective adjoining digit-indicating wheels is essentially an intermittent-motion gear drive with an intermediate gear added to cause the same directional rotation for the respective digit-indicating wheels. This drive means interconnecting two adjacent digit-indicating wheels is the same throughout the register-counter 11 and is exemplified by the FIG. 1 showing and the more detailed FIG. 2 showing (taken along line II—II of FIG. 1) which portrays the intermittent-motion gear train. Looking now at the drive interconnection between "units" digit-indicating wheel 13 and "tens" digit-indicating wheel 14, there is seen intermediate the two indicating wheels an idler shaft 27 suitably supported (for free rotation) at its ends by conventional bearings 18 and 19, respectively. Fixedly mounted on this idler shaft 27 is gear 28 which meshes with the gear 21 fixedly mounted to "units" wheel shaft 17. Also fixedly mounted on idler shaft 27 is the driver 31 of a conventional Geneva drive mechanism. This driver 31 consists of a wheel 32 which has a raised portion 36 and carries a projecting pin 33. The driven portion of the Geneva mechanism is a wheel 34 fixedly mounted on the shaft 24 and provided with a number of equally spaced radially extending slots 37. The driven wheel 34 makes $1/10$ of a revolution for each revolution of the driver 32, the pin 33 carried by driver wheel 32 periodically entering one of the slots 37 on driven wheel 34 to cause the periodic rotary motion of driven wheel 34. FIG. 2(a) shows the intermittent-motion Geneva mechanism as the pin 33 of driver wheel 32 begins to enter a slot 37 at position A to begin to rotate driven wheel 34. It will be noted that the raised portion 36 of driver wheel 34 is cut away as indicated at B so as to allow the corners 39 of the driven wheel 34 to clear. At the end of the rotary movement of the driven wheel 34, pin 33 will leave the slot 37, with which it has been engaged, at position C as seen in FIG. 2(b). As pin 33 leaves the slot 37, the portion D of the driver wheel raised portion 36 comes around and engages the circular portion E of the driven wheel 34 to lock the driven wheel 34 against further rotation until pin 33 once again arrives to mate with a slot 37. (Note that driver 31 rotates in a clockwise direction and that driven wheel 34 rotates in a counterclockwise direction.) It is with this intermittent motion attained by use of the Geneva drive mechanism, or any similar conventional intermitten-motion apparatus, that each sequential digit-indicating wheel shaft is rotated $1/10$ of a revolution for a complete revolution of the preceding digit-indicating wheel shaft.

Casing 12, as can be seen in FIGS. 1 and 3, is formed with a plurality of window openings 41 therein, each of these window openings 41 being centrally disposed over a digit-indicating wheel and being so dimensioned as to display to view, through the casing, only that digit on the digit-indicating wheel which lies directly below the window opening at the given moment.

FIGS. 3 and 4 portray an individual digit-indicating wheel herein designated 42, such as would comprise such digit-indicating wheels as 13, 14 or 16, previously mentioned, and illustrate the low-inertia magneto-mechanical aspects of the present drive system which are at the heart of this register-counter's capability for operating at high speeds. This typical digit-indicating wheel 42 is mounted for free rotation around its shaft herein designated 43. Portion 44 of the digit-indicating wheel 42 is slideably mounted on the shaft 43 with substantially no friction between it and the shaft. The digit-indicating wheel 42 is held on its longitudinal position on the shaft 43 by a pair of retainer washers 46 and 47, respectively, which sit astride portion 44 of digit-indicating wheel 42 and which fit into annularly disposed grooves on the shaft 43. Mounted on the inner cylindrical face of the digit-indicating wheel 42 and extending therefrom in diametrically opposed positions are a pair of alignment magnets 48 and 49, respectively, which present to the shaft 43 oppositely poled faces 51 and 52, respectively. Embedded in fixed position in shaft 43 is a small permanent magnet 53 which presents, at its respective outer ends oppositely poled magnetic faces 54 and 56.

The magnetic structure above described permits a magnetic coupling action between the drive shaft 43 and the digit-indicating wheel 42.

As previously noted each indicator wheel is mounted for free rotation in perfect balance, each digit-indicating wheel, per se, preferring no rotational position to any other irrespective of the given attitude of the wheel. In operation, a low-mass drive system, consisting principally of the individual digit-indicating wheel drive shafts and the small permanent magnets carried thereby and, of course, the associated intermittent-motion transfer gear mechanism can be driven at high speed. The individual digit-indicating wheels will attempt to keep up with their various drive shafts with indifferent success. This lag of the digit-indicating wheels poses no problem since, when the drive system stops for readout, the digit-indicating wheels will coast to a stop within a few turns more or less depending upon the degree of magnetic coupling between the alignment magnets carried by the digit-indicating wheel and the magnet embedded in the drive shaft. According to well known magnetic laws the digit-indicating wheels will line up with the magnets carried by their drive shafts when the magnetic coupling becomes operative. FIGS. 3 and 4 show the digit-indicating wheel 42 in aligned rotational position with respect to its drive shaft 43. With the digit-indicating wheel so aligned with its shaft, the digit-indicating wheel will display via its window opening 41 the operative digit corresponding to the drive input to the drive shaft 43.

This operative readout position of the digit-indicating wheel is unequivocal and an indicating wheel will turn half a turn, if necessary, to come into alignment and proper position. The net result of the particular magnetically-coupled drive system portrayed above is to produce a low mass drive system having a low angular moment of inertia. It is this low mass, low angular moment of inertia characteristic that permits the register-counter disclosed herein to operate effectively at high speeds. This same characteristic makes for longer life and more reliable operation of the register-counter.

An optional feature of the register-counter 11 is an operator-releasable latching means 57 portrayed in FIGS.

1 and 4. This latching means 57 comprises a series of latching members 58 (each of which is individual to one of the digit-indicating wheels of the register-counter 11) and a release rod 59. Each latching member 58 (best seen in FIG. 4) is pivotally mounted at a point G to a supporting member 61 which is rigidly mounted to the casing 12. Each latching member 58 is resiliently biased downwardly, by an under-tension, contracting spring 62 which extends between the latching member 58 and casing 12, to have its grasping end 63 brought into forceful abutting contact, via window opening 41, with the digit-bearing outer face of digit-indicating wheel 42. With each of these latching members 58 effectuating a friction hold on its associated digit-indicating wheel, the digit-indicating wheels can be held in fixed, stationary position during a count-adding operation of the register-counter. Passing through these latching members 58 is a common release rod 59 which can be lifted by an operator to release the holding action on the digit-indicating wheels by these latching members 58. By the use of such an operator-releasable latching means as 57 the prior reading displayed by the register-counter can be positively held while adding up another count(s) and then released, as desired, to allow the digit-indicating wheels to shift to their aligned positions to reflect the current input total of the register-counter.

With regard to this matter of holding a prior digit count on the register-counter during a count adding operation, it is to be parenthetically stated here that, even without latching means 57 being present, the inertia of the digit-indicating wheels (which are magnetically uncoupled to their associated supporting shafts throughout most of a count-adding operation) will cause them to substantially hold the prior count during most of the interval of a count-adding operation. Latching means 57 makes such a prior-count-holding function more positive and makes the count holding interval at the option of the operator, even enabling a prior count to be held for multiple successive count-adding operations.

Obviously many modifications and variations of the present invention are possible in the light of the above teaching. It is intended to cover all changes and modifications of the embodiments set forth herein which do not constitute departures from the spirit and scope of this invention.

What is claimed is:

1. A high-speed register-counter comprising:
   (a) a series of parallelly-disposed shafts;
   (b) a plurality of digit-indicating wheels adapted to display, in cooperative combination, a serial train of digits, each of said digit-indicating wheels being slideably mounted on one of said parallelly-disposed shafts and in substantially perfect balance for free rotational movement about its shaft, each digit-indicating wheel substantially preferring no particular rotational position over any other, irrespective of its given attitude at the time, and each of said digit-indicating wheels bearing, on its outer annular periphery, a series of equally-spaced digits ranging from "0" to "9";
   (c) enclosure means disposed in covering position over said digit-indicating wheels and formed with a plurality of window openings therein, each of said window openings being disposed over one of said respective digit-indicating wheels and being adapted to display therethrough to human view a single one of the digits on the underposed digit-indicating wheel;
   (d) mechanical driving means, adapted to connect to an externally-driven shaft, for driving said various parallelly-disposed shafts, according to the count-adding input from said externally-driven shaft, in a step-advancing operation wherein a succeeding shaft makes one-tenth of a revolution for each complete revolution of the next-previous shaft in the series of shafts; and
   (e) magnetic clutching means, individual to each digit-indicating wheel and connected, in part, to each digit-indicating wheel and, in part, to the shaft about which the given digit-indicating wheel rotates, for causing said digit-indicating wheel with which it is associated to assume an unequivocal rotational position which is in rotational alignment with the rotational position of the shaft about which the given digit-indicating wheel rotates, each of said digit-indicating wheels having an unequivocal rotational position which corresponds to any given operative rotational position of the shaft about which it rotates for displaying, via the window opening associated with said digit-indicating wheel, the particular digit on said digit-indicating wheel which corresponds to the present rotational position of the shaft about which said digit-indicating wheel rotates.

2. The high-speed register-counter of claim 1 wherein said magnetic clutching means individual to each of said digit-indicating wheels consists of:
   (a) a rectilinearly-disposed magnet medially mounted in a fixed position to the shaft about which the given digit-indicating wheel rotates, said magnet extending in a radial direction with respect to both said shaft and the digit-indicating wheel associated therewith and presenting at its respective ends, which are located at diametrically-opposed positions with respect to said shaft, respective poles of opposite polarity; and
   (b) a pair of magnets mounted on the inner portion of said digit-indicating wheel, each of said pair of magnets extending in a radial direction with respect to said shaft and extending along the same radial line from diametrically opposite positions of the inner portion of said digit-indicating wheel, the respective radially-innermost ends of said respective pair of magnets presenting faces of opposite polarity, said digit-indicating wheel being in rotational alignment with its associated shaft when said magnet mounted to said shaft is radially aligned with said pair of magnets mounted on said digit-indicating wheel and when the adjacent ends of said shaft-mounted magnet and said digit-indicating-wheel-mounted magnets in their radially-aligned positions present complementary poles to one another.

3. The high speed register-counter of claim 1 further characterized by:
   (a) operator-releasable latching means, mounted on said enclosure means, for holding said respective digit-indicating wheels in fixed position, rendering said digit-indicating wheels immune to movement induced by said magnetic clutching means until said latching means is released by an operator, said latching means being useable to hold a prior reading, as reflected in the displayed digits of said digit-indicating wheels, while said register-counter is undergoing count-adding operation.

4. In a high-speed register-counter having a series of parallelly-disposed shafts, a plurality of digit-indicating wheels, each digit-indicating wheel being mounted in substantially perfect balance for free rotational movement about one of said shafts, driving means for driving said shafts in a step-advancing operation wherein a succeeding shaft makes one-tenth of a revolution for each complete revolution of the next-preceding shaft in the series of shafts, and enclosure means covering said digit-indicating wheels and formed with a window opening over each digit-indicating wheel through which a single digit is displayed to view by said wheel, magnetic clutching means, individual to each digit-indicating wheel and connected, in part, to each digit-indicating wheel and, in part, to the shaft about which the given digit-indicating wheel rotates, for causing said digit-indicating wheel with which it is associated to assume an unequivocal rotational position which is in rotational alignment with the rotational position of the shaft about which the given digit-indicating wheel rotates, each of said digit-indicating wheels having an unequivocal rotational position which corresponds to any given operative rotational position of the shaft about which it rotates for displaying, via the window opening associated with said digit-indicating wheel, the particular digit on said digit-indicating wheel which corresponds to the present rotational position of the shaft about which said digit-indicating wheel rotates.

5. The high-speed register counter of claim 4 wherein said magnetic clutching means individual to each of said digit-indicating wheels consists of:

(a) a rectilinearly-disposed magnet medially mounted in a fixed position to the shaft about which the given digit-indicating wheel rotates, said magnet extending in a radial direction with respect to both said shaft and the digit-indicating wheel associated therewith and presenting at its respective ends, which are located at diametrically-opposed positions with respect to said shaft respective poles of opposite polarity; and (b) a pair of magnets mounted on the inner portion of said digit-indicating wheel, each of said pair of magnets extending in a radial direction with respect to said shaft and extending along the same radial line from diametrically-opposite positions of the inner portion of said digit-indicating wheel, the respective radially-innermost ends of said respective pair of magnets presenting faces of opposite polarity, said digit-indicating wheel being in rotational alignment with its associated shaft when said magnet mounted to said shaft is radially aligned with said pair of magnets mounted on said digit-indicating wheel and when the adjacent ends of said shaft-mounted magnet and said digit-indicating-wheel-mounted magnets in this radially-aligned position present complementary poles to one another.

6. The high-speed register-counter of claim 2 further characterized by (a) operator-releasable latching means, connected to said enclosure means, for holding, at the operator's option, a given prior count displayed by said plurality of digit-indicating wheels while said register-counter is undergoing later count-adding operations, the release of said latching means at the end of said count-adding operations allowing said magneto-mechanical driving means to bring the respective digit-indicating wheels of said plurality of digit-indicating wheels to operative digit-indicating rotational position to display a series of digits indicating the final count input of said register-counter resulting from said count-adding operations.

References Cited in the file of this patent

UNITED STATES PATENTS

| | | |
|---|---|---|
| 2,416,081 | Bakke | Feb. 18, 1947 |
| 2,757,364 | Hood | July 31, 1956 |
| 3,076,184 | Glass | Jan. 29, 1963 |